Patented July 15, 1947

2,424,084

UNITED STATES PATENT OFFICE 2,424,084

PROCESS FOR THE MANUFACTURE
OF OLEFIN OXIDES

Harry de V. Finch, Berkeley, Calif., and Ingolfur
Bergsteinsson, Billings, Mont., assignors to
Shell Development Company, San Francisco,
Calif., a corporation of Delaware No Drawing. Application August 11, 1943,
Serial No. 498,429

8 Claims. (Cl. 260—348.5)

1

This invention relates to the production of olefin oxides by effecting the direct catalytic oxidation of olefins with oxygen. More particularly it relates to a commercially attractive process for the catalytic oxidation of olefins, particularly ethylene, to the corresponding olefin oxides, which process comprises treating an olefin with oxygen or an oxygen-containing gas in the presence of a novel catalyst composition comprising a support material and an adherent, uniform deposit of active silver formed upon and in the presence of the support material.

Numerous processes have been proposed for preparing olefin oxides by reacting olefins with oxygen at elevated temperatures in the presence of a silver catalyst. In accordance with these known processes, the oxidation has been effected in the presence of silver which is in either the massive form or in a finely divided state. Silver catalysts in the massive form include silver leaf, sponge, mesh, pellet and other forms of massive proportions. The finely divided silver catalysts used in these processes have been prepared by methods such as, for example, the thermal decomposition of a decomposable silver compound in a reducing or inert medium, or the precipitation of metallic silver from solutions or suspensions of silver compounds. Finely divided silver has also been deposited in this manner upon suitable carrier or support materials, such as charcoal, diatomaceous earths, crushed firebrick, fuller's earth, fused alumina, marble, sandstone, selected clays, and the like. Such silver catalysts have also been activated by the incorporation of small amounts of metals, such as copper or gold, or by a treatment with an alkali material, such as sodium hydroxide, or the peroxides, oxides or hydroxides of barium, strontium or lithium.

The oxidation of olefins to olefin oxides by means of these well known catalysts has been attended by certain disadvantages. For example, the massive catalysts require too much silver to be commercially attractive. The finely divided unsupported catalysts also require relatively large amounts of silver and in addition they tend to sinter and become inactive. The known supported silver catalysts lack durability of structure, especially when contacted with liquids either prior to or during the operation of the catalytic oxidation; and tend to lose their initial catalytic activity too rapidly, particularly at the elevated temperatures at which they are customarily used. They also lack uniformity of composition. Such lack of uniformity results in variations in cata-

2 lyst behavior during operation, thereby necessitating costly and time-consuming readjustment of operating conditions whenever the catalyst is replaced.

It is an object of this invention to avoid the above and other defects of the prior art. It is another object to provide a process of increased efficiency and economy for the direct catalytic oxidation of olefins wherein the reaction is effected in the presence of novel silver-containing catalyst compositions of increased activity, increased stability, and containing small but adequate amounts of silver per unit volume of catalyst. It is another object to provide a novel, efficient and economical process for the direct oxidation of olefins, which novel process is particularly adapted to the preparation of ethylene oxide. It is a further object to provide a process which, by virtue of the characteristics of the novel catalysts used in its execution, is superior to any of the processes heretofore proposed in that it can be executed more economically on a commercial scale.

It has now been found that the direct oxidation of olefins to the corresponding olefin oxides can be carried out with greater efficiency and economy by reacting an olefin with oxygen in the presence of the novel silver catalysts described and claimed in the copending U. S. application Serial No. 498,428, filed August 11, 1943. These novel silver catalysts may be prepared by a process which, stated broadly, comprises silvering a suitable carrier or support material by treating it successively and preferably in the order named with the following reagents: a solution or suspension of a silver compound, ammonia or ammonium hydroxide, a strong base, such as sodium hydroxide, a further quantity of ammonia or ammonium hydroxide, and a reducing agent. Upon allowing the carrier or support material to stand in contact with these reagents for the desired or optimum periods of time, a thin film of silver, usually in the form of a silver mirror, is deposited upon the support material. This forms the desired catalytic surface.

Silver deposited in this manner upon a large variety of support materials has invariably shown high activity in catalyzing the direct oxidation of ethylene even when known methods of depositing the silver on the same support materials have failed to provide an active catalyst. These silver catalysts are exceptionally durable, little or no decline in activity having been observed even after several hundred hours of operation at temperatures of up to, for example, about 500° C. These qualities of the catalysts, in addition to the fact that the silver required per unit volume of catalyst or per pound of ethylene oxide per day is much less than with known types of silver catalysts, render the process of the present invention very efficient and economical.

The silver catalysts used in carrying out the process of the invention may be prepared by using any one or more of a large number of substantially inert carriers or support materials. Although finely divided porous materials such as diatomaceous earth, fullers earth, selected clays and the like comprise suitable support materials, it is generally preferred to use materials of a larger particle size such as pumice, calcined granular diatomaceous earth, porous granules of silica, silicon carbide, alumina, carbon, magesium oxide, cruhed firebrick, bauxite, marble, Pyrex glass, sandstone, majolica, artificial and natural zeolites, and metal oxide gel-type materials comprising the oxides of chromium, molybdenum, tungsten and the like. Porous aggregates may be prepared by bonding together granules of one or several of the above materials. Aggregates comprising from 75% to 90% of alumina and 25% to 10% of silica, bonded together by fusing with a ceramic bonding clay or other bonding material, provide exceptionally good supports.

In a preferred embodiment of the method for preparing the catalysts used in the process of the invention, any one of these or similar carriers may be added to an aqueous solution of silver nitrate, the mixture being then boiled for from about 10 minutes to 30 minutes in order to impregnate the support material thoroughly with the silver nitrate solution. Ammonium hydroxide is then slowly added in an amount just sufficient to redissolve the precipitate initially formed. To this solution there is then slowly added an aqueous solution of a strong base, e. g. sodium hydroxide, in an amount which may vary between a slight excess and about three times the stoichiometric equivalent required to convert the silver present to silver oxide, the amount of base thus added being in any case sufficient to make the solution strongly alkaline. Ammonium hydroxide is then added in an amount just sufficient to dissolve the silver oxide precipitate and maintain the silver in solution. A reducing agent, which may comprise, for example, glucose, is then added to the mixture to reduce the redissolved silver compound and to precipitate the metallic silver upon the inert support material. The mixture of silvering solution, reducing solution and the support material may be allowed to stand at room temperature for a period of time sufficient to effect the deposition of the desired amount of metallic silver upon the support. The time required will vary with the nature of the solutions used, but may be, for example, from ½ to 1½ hours. After the mixture has stood for the desired or optimum period of time, the liquid may be decanted from the catalyst, which latter may then be washed with water, for example by decantation, to remove the water soluble material. The catalyst so prepared is in an active form and need not be subjected to an activating treatment or dried. However, drying by any suitable means, as by heating or subjection to reduced pressure may be employed if desired.

Although, as stated, the catalysts prepared in the described manner are already in an active form, their activity may, if desired, be further promoted or modified by the addition, in any desired or optimum amount, of any one or more of a plurality of elements or compounds which are known to promote or modify the catalytic activity of silver metal. Representative promoters are, for example, the metals such as gold, copper, platinum, nickel, iron, etc.; the metal oxides and other metal compounds, particularly the alkali metal and alkaline earth metal oxides, hydroxides and carbonates; and some halogen compounds. The activity of the above-defined catalysts may, in many instances, be materially increased or promoted by the addition of small amounts of a sodium compound. Such promoted catalysts may be prepared, for instance, by adding the desired or optimum quantity, e. g. up to about 8% calculated as per cent of silver present, of a sodium compound, such as sodium hydroxide or sodium nitrate. The sodium compound may be conveniently added in the form of an aqueous solution which is poured over the silvered support, the excess sodium solution being then removed by decantation and the wet silvered support dried to leave a deposit of sodium compound upon the catalyst surface. It has been found particularly effective, however, to add about three volumes of water to the freshly prepared but unwashed silver catalyst prepared as described hereinabove. In accordance with this procedure, the mixture of silvered support material and residual silvering solution is diluted with about three volumes of water. The silvered support material is then drained and dried. This leaves a residue of sodium compounds from the silvering solution on the catalyst surface and results in the formation of a particularly active catalytic surface. Such promoted catalysts generally give higher yields and higher conversions than do the unpromoted catalysts. They are also active at lower temperatures and are less susceptible to poisoning.

Although the foregoing represents a preferred procedure for preparing the silver catalysts of the invention, the procedure used may vary within reasonably wide limits. For instance, instead of impregnating the carrier with a silver salt solution and then adding ammonium hydroxide, an ammoniacal silver salt solution may be prepared and the carrier material impregnated therewith. Alternatively, a silvering solution comprising a suitable silver salt, an alkali metal hydroxide, ammonium hydroxide and a reducing agent may be prepared as described above prior to the addition of the support material. The support material may then be added thereto and its silvering effected in the usual manner. In such a case, however, the support material must be added substantially immediately after mixing the components of the silvering solution. Other modifications may be made as necessary without departing from the scope of the invention as defined hereinabove.

The catalytic oxidation process of the present invention may be carried out, for example, by passing a stream of an olefin or olefin-containing gas in admixture with oxygen or an oxygen-containing gas, at an elevated temperature, over an active silver catalyst of the type described hereinabove to give a reaction product consisting of or comprising the olefin oxide corresponding to the olefin present in the original mixture. Olefins capable of being thus catalytically oxidized to the corresponding olefin oxides are the normally gaseous as well as the readily volatile normally liquid olefinic hydrocarbons such as, for example, ethylene, propylene, the butylenes, the amylenes and their homologues and suitable substitution products. The olefins may be employed individually or in mixtures thereof with each other or with other compounds. Mixtures of olefins with relatively unreactive substances, for example mixtures of olefins and paraffins, may also be employed without resorting to any separation of the olefin or olefins therefrom prior to their being subjected to the aforementioned oxidation process. Such olefins or olefin-containing mixtures may be obtained from any suitable source as, for example, from any petroleum refining operation such as the distillation, thermal cracking, hydrogenation, dehydrogenation, polymerization, etc., of hydrocarbon fluids, or they may be obtained from the processes of the natural gas industry, etc.

Varying ratios of oxygen to olefin may be used, depending upon the conditions under which the oxidation is to be effected. It is preferred, however, to use an amount of oxygen equal to or slightly in excess of the stoichiometric amount necessary to combine with the olefins present in the reaction zone. The oxygen may be introduced as free oxygen or in admixture with other gaseous materials such as air, steam, nitrogen, carbon dioxide, etc. If desired, the free oxygen may be liberated or formed from oxygen-containing substances during the operation of the process.

The process of the invention may be carried out at any suitable temperatures in the broad range of from about 100° C. to about 500° C. However, one of the advantages of the present process is that the use of the above-described class of catalysts permits the efficient oxidation of olefin hydrocarbons to the corresponding oxides, with materially increased yields over prolonged periods of operation, at temperatures not exceeding about 360° C. Thus, the oxidation of ethylene to ethylene oxide may be effected at a temperature of from about 200° C. to about 360° C. in the presence of an active catalyst comprising a support material, particularly silicon and/or silicon carbide, which carries an adherent, uniform deposit of silver.

Any suitable means may be used to supply heat to the reactants or to the reaction zone or, if necessary or desired, to withdraw excess heat therefrom in the course of the reaction.

Although it is preferred to carry out the process of the invention at about atmospheric pressure, subatmospheric or superatmospheric pressures may also be used if desired. The optimum pressure will in general be determined by the conditions of operation and the nature of the materials processed.

The reaction products resulting from the process may be subjected to any subsequent treatment to separate the desired olefin oxide or oxides. Thus, the olefin oxide may be separated from the remaining reaction products by any suitable method of separation, such as fractionation, absorption and extraction, or by a combination of these methods or steps.

The following examples are given for the purpose of illustrating the process of the invention.

Example I

To 100 cc. of thoroughly washed pumice there was added 200 cc. of 0.147 N silver nitrate solution. The mixture was boiled for 15 minutes and cooled to 20° C. To the cooled mixture there was slowly and successively added 6 cc. of 28% NH4OH and 100 cc. of 0.8 N NaOH solution, the mixture being stirred throughout said additions. An additional 3 cc. of 28% NH4OH was added and the stirring continued for about 5 minutes.

A reducing solution was prepared by dissolving 8 grams of cane sugar in 80 cc. of water, adding 10 cc. of ethyl alcohol and 0.35 cc. of concentrated $HNO_3$ to the sugar solution and boiling the resulting solution for about 5 minutes.

About 12 cc. of the cooled reducing solution was rapidly added to the above mixture of pumice and silver salt solution. The resulting mixture was allowed to stand for one hour with occasional shaking. The spent silvering solution was then diluted with 3 volumes of distilled water, and the diluted solution decanted from the silvered pumice.

25 cc. of the above described catalyst was placed in a Pyrex tube having an internal diameter of 20 mm. An ethylene-air mixture consisting of 1 part by volume of ethylene and 5 parts by volume of air (therefore, an ethylene-oxygen ratio of about 1:1) was passed continuously over the catalyst at a temperature of about 250° C., at substantially atmospheric pressure, and at a rate of about 60 cc. of the ethylene-air mixture per hour. The contact time was therefore equal to about 25 seconds. At the end of 80 hours of operation the conversion per pass of ethylene to ethylene oxide was 20% based on ethylene charged, while the yield of ethylene oxide based on the total oxidized ethylene was 62%.

Example II

A thoroughly washed porous 3/16 mesh ceramically bonded mixture of aluminum and silica, which mixture contained about 85% alumina and 11% silica, was degassed by subjection to a subatmospheric pressure. To 150 cc. of this degassed support material there was added 200 cc. of a 0.147 N silver nitrate solution. The mixture was boiled for 15 minutes and then cooled to about 20° C. To the cooled mixture there was slowly and successively added 6 cc. of 28% NH4OH and 100 cc. of 0.8 N NaOH solution, the mixture being stirred while making said additions. An additional 3 cc. of 28% NH4OH was added and the stirring continued for about 5 minutes. 150 cc. of a reducing glucose solution, prepared by the method used in Example I, was rapidly added to the mixture of support and silver solution, and the mixture was allowed to stand for about two hours. The liquid was then decanted from the solid catalyst, and the catalyst washed with water by decantation.

25 cc. of the above-described catalyst was placed in a 20 mm. Pyrex tube. An ethylene-air mixture consisting of 1 part by volume of ethylene and 5 parts by volume of air was passed continuously over the catalyst, at a temperature of about 290° C. and at substantially atmospheric pressure, at the rate of 60 cc. of the ethylene-air mixture per hour. At the end of 200 hours of operation the conversion per pass of ethylene to ethylene oxide was 34% based on ethylene charged, and the yield of ethylene oxide based on the total oxidized ethylene was 64%.

Example III

To 100 cc. of thoroughly washed pumice there was added 220 cc. of 0.118 N silver nitrate solution. The mixture was boiled for 15 minutes and cooled to a temperature of about 20° C. To the cooled mixture there was slowly added with stirring 2 cc. of 28% ammonium hydroxide and the stirring was continued for about 5 minutes. To the resulting mixture there was rapidly added with stirring 44 cc. of an aqueous solution of formaldehyde containing 3 gm. of formaldehyde. The mixture was allowed to stand for 1 hour, at the end of which time the liquid was decanted from the solid catalyst and the catalyst washed with water.

25 cc. of the above-mentioned catalyst was placed in a Pyrex tube having an internal diameter of 20 mm. An ethylene-air mixture consisting of 1 part by volume of ethylene and 5 parts by volume of air was passed continuously over the catalyst at a temperature of about 290° C. and at substantially atmospheric pressure, at the rate of 60 cc. of ethylene-air mixture per minute. After about 70 hours of operation the yield of ethylene oxide based on the total oxidized ethylene was 55%.

While the invention has been described in a detailed manner, and examples illustrating suitable modes of executing the same have been provided, it is to be understood that modifications may be made and that no limitations other than those imposed by the scope of the appended claims are intended.

We claim as our invention:

1. A process for the production of ethylene oxide by the direct catalytic oxidation of ethylene which comprises reacting ethylene with oxygen employed in excess of the stoichiometric amount necessary to combine with the ethylene and effecting the reaction at a temperature of between about 200° C. and 360° C. and in the presence of a catalyst essentially comprising a substantially inert support material and an adherent, uniform, pellicular deposit of silver metal formed upon and in the presence of the support material by mixing granules of the said support material with an aqueous solution of silver nitrate, adding ammonuim hydroxide to the resulting mixture in an amount substantially only sufficient to dissolve any silver-containing precipitate caused by the addition of the ammonium hydroxide to the silver nitrate solution, introducing an aqueous sodium hydroxide solution into the said mixture in an amount sufficient to precipitate the silver in the form of silver oxide, adding ammonium hydroxide in an amount substantially only sufficient to redissolve the silver and maintain it in solution, reacting said solution with a glucose solution for a period of time sufficient to effect the formation of an adherent, uniform, pellicular deposit of silver upon the support material, and separating the silvered support material from the reaction mixture.

2. A process for the production of olefin oxides which comprises reacting an olefin with oxygen at a temperature of between about 100° C. and about 500° C. and in the presence of a catalyst essentially comprising a substantially inert support material and an adherent, uniform, pellicular deposit of silver metal formed upon and in the presence of the inert support material by mixing granules of the said support material with an aqueous solution of silver nitrate, adding ammonium hydroxide to the resulting mixture in an amount substantially only sufficient to dissolve any silver-containing precipitate caused by the addition of the ammonium hydroxide to the silver nitrate solution, introducing an aqueous sodium hydroxide solution into the said mixture in an amount sufficient to precipitate the silver in the form of silver oxide, adding ammonium hydroxide in an amount substantially only sufficient to redissolve the silver and maintain it in solution, reacting said solution with a glucose solution for a period of time sufficient to effect the formation of an adherent, uniform, pellicular deposit of silver upon the support material, diluting the silvering solution with water, separating the diluted solution from the silvered catalyst, and drying the said catalyst, thereby leaving upon the surface thereof a promoting amount of sodium compounds derived from the sodium hydroxide content of the said silvering solution.

3. A process for the production of ethylene oxide which comprises reacting ethylene with oxygen employed in excess of the stoichiometric amount necessary to combine with the ethylene at a temperature of between about 200° C. and about 360° C. and in the presence of a catalyst essentially comprising a substantially inert support material and an adherent, uniform, pellicular deposit of silver metal formed upon and in the presence of the support material by forming a mixture comprising the said support material and an aqueous ammoniacal solution of silver nitrate, introducing an aqueous sodium hydroxide solution into said mixture in an amount sufficient to precipitate the silver in the form of silver oxide, adding ammonium hydroxide in an amount substantially only sufficient to redissolve the precipitate, adding a reducing agent capable of reducing to metallic silver the silver compounds present in the silvering solution, thereby forming an adherent, uniform, pellicular deposit of silver upon the support material, and separating said silvered support material from the reaction mixture.

4. A process for the production of ethylene oxide by the direct catalytic oxidation of ethylene which comprises reacting ethylene with oxygen employed in excess of the stoichiometric amount necessary to combine with the ethylene and effecting the reaction at a temperature of between about 200° C. and 360° C. and in the presence of a catalyst essentially comprising a substantially inert support material and an adherent, uniform, pellicular deposit of silver metal formed upon and in the presence of the support material by forming a mixture comprising the support material and an aqueous ammoniacal solution of a silver salt, introducing an aqueous sodium hydroxide solution into said mixture in an amount sufficient to precipitate the silver in the form of silver oxide, adding ammonium hydroxide in an amount substantially only sufficient to redissolve the silver oxide, adding a reducing agent capable of effecting the conversion of the silver compounds present in the silvering solution to metallic silver, thereby effecting the formation of an adherent, uniform, pellicular deposit of silver upon the support material, and separating said silvered support material from the reaction mixture.

5. A process for the production of ethylene oxide which comprises reacting ethylene with oxygen employed in excess of the stoichiometric amount necessary to combine with the ethylene at a temperature of between about 200° C. and about 360° C. and in the presence of a catalyst essentially comprising a substantially inert support material and an adherent, uniform, pellicular deposit of silver metal formed upon and in the presence of the support material by forming a mixture comprising the support material and an aqueous ammoniacal solution of silver salt, introducing an alkali metal hydroxide into said mixture in an amount sufficient to precipitate the silver in the form of silver oxide, adding ammonium hydroxide in an amount substantially only sufficient to redissolve the silver oxide, adding a reducing agent capable of effecting the reduction of the silver compounds present in the solution and the precipitation of silver therefrom for a period of time sufficient to effect the formation of an adherent, uniform, pellicular deposit of silver upon the support material, and separating said silvered support material from the reaction mixture.

6. A method for the production of olefin oxides by the direct catalytic oxidation of olefins which comprises reacting an olefin with oxygen employed in excess of the stoichiometric amount necessary to combine with the said olefin and effecting the reaction at a temperature of between about 200° C. and about 360° C. and in the presence of a catalyst essentially comprising a substantially inert support material and an adherent, uniform, pellicular deposit of silver metal formed upon and in the presence of the support material by forming a mixture comprising the said support material and an aqueous ammoniacal solution of a silver salt, introducing an alkali metal hydroxide into said mixture in an amount sufficient to precipitate the silver in the form of silver oxide, adding ammonium hydroxide in an amount substantially only sufficient to dissolve the silver oxide and maintain it in solution, reacting said solution with a reducing agent capable of converting the silver compounds to metallic silver, thereby forming an adherent, uniform, pellicular deposit of silver upon the support material, and separating said silvered support material from the reaction mixture.

7. A process for the production of olefin oxides which comprises reacting an olefin with oxygen in excess of the stoichiometric amount necessary to combine with the said olefin at a temperature of between about 100° C. and about 500° C. and in the presence of a catalyst essentially comprising a substantially inert support material and an adherent, uniform, pellicular deposit of silver metal formed upon and in the presence of the support material by forming a mixture comprising the support material and an aqueous ammoniacal solution of a silver salt, introducing an alkali metal hydroxide into said mixture in an amount sufficient to precipitate the silver in the form of silver oxide, adding ammonium hydroxide in an amount substantially only sufficient to redissolve the silver and maintain it in solution, reacting said solution with a reducing agent capable of effecting precipitation of metallic silver from the said solution for a period of time sufficient to form an adherent, uniform, pellicular deposit of silver upon the support material, and separating said silvered support material from the reaction mixture.

8. A process for the production of olefin oxides which comprises reacting an olefin with oxygen at a temperature of between about 100° C. and about 500° C. and in the presence of a catalyst essentially comprising a substantially inert support material and an adherent, uniform, pellicular deposit of silver metal formed upon and in the presence of the support material by forming a mixture comprising a substantially inert support material and an aqueous ammoniacal solution of silver salt, introducing an alkali metal hydroxide into said mixture in an amount sufficient to precipitate the silver in the form of silver oxide, adding ammonium hydroxide in an amount substantially only sufficient to redissolve the silver oxide and maintain it in solution, reacting said solution with a reducing agent capable of precipitating metallic silver from the said solution, thereby forming an adherent, uniform, pellicular deposit of silver upon the support material, and separating said silvered support material from the reaction mixture.

HARRY DE V. FINCH.
INGOLFUR BERGSTEINSSON.

REFERENCES CITED

The following references are of record in the file of this patent:

UNITED STATES PATENTS

| Number | Name | Date |
|---|---|---|
| 2,178,454 | Metzger | Oct. 31, 1939 |
| 2,245,183 | Christ et al. | June 10, 1941 |
| 2,238,474 | McNamee et al. | Apr. 15, 1941 |
| 2,125,333 | Carter | Aug. 2, 1938 |
| 2,279,469 | Law | Apr. 14, 1942 |
| 2,040,782 | Peski | May 12, 1936 |
| 2,142,948 | Law | Jan. 3, 1939 |
| 1,937,728 | Storch | Dec. 5, 1933 |
| 2,034,077 | Arnold | Mar. 17, 1936 |
| 1,739,306 | Holmes | Dec. 10, 1929 |
| 2,113,977 | Barnes | Apr. 12, 1938 |

FOREIGN PATENTS

| Number | Country | Date |
|---|---|---|
| 500,382 | Great Britain | 1939 |
| 514,792 | Great Britain | Nov. 17, 1939 |